Sept. 17, 1963 A. HOHMANN 3,103,983
FRICTION ERROR CORRECTING DEVICE
Filed Jan. 4, 1962 4 Sheets-Sheet 1
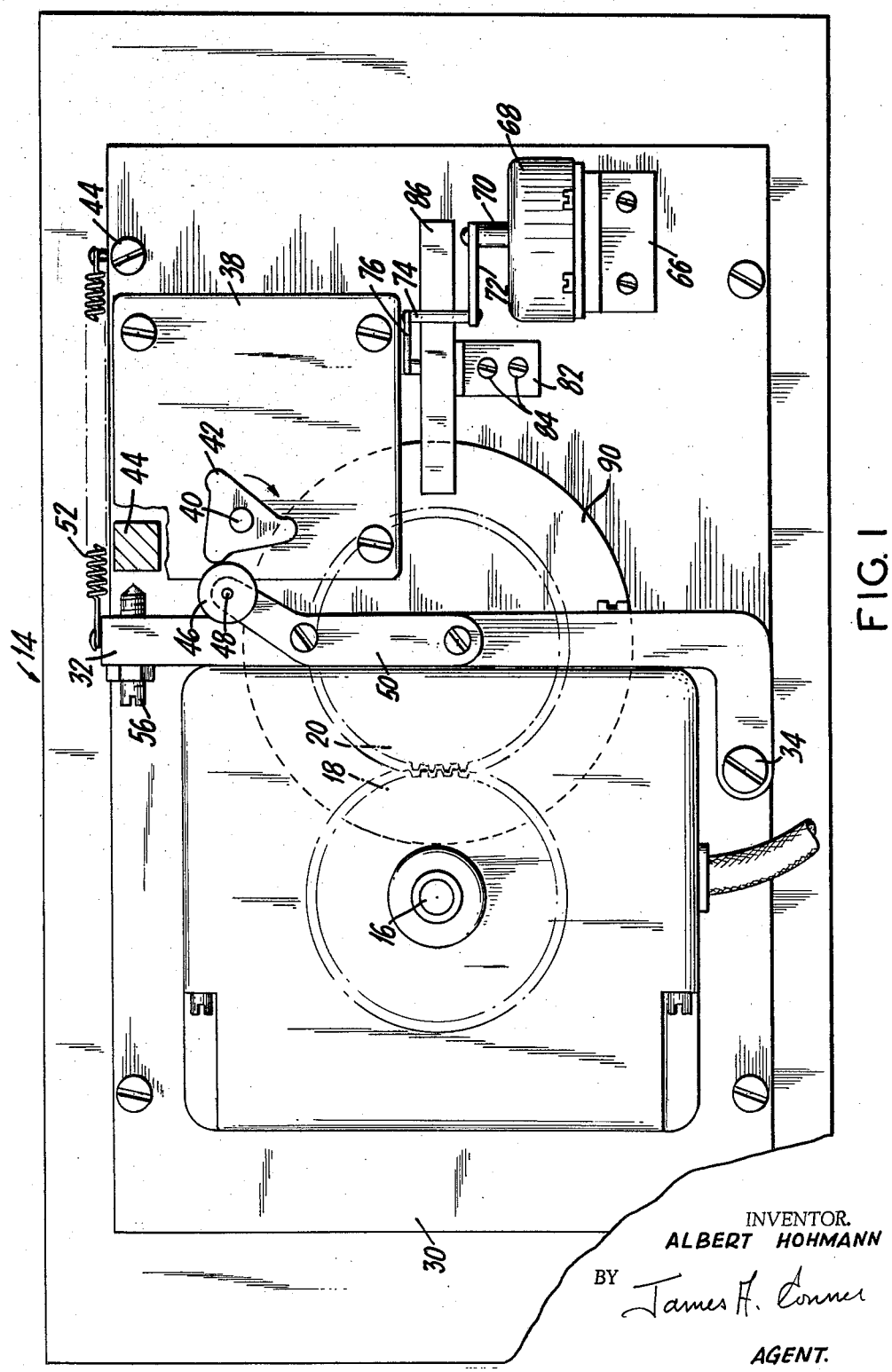
FIG. I
INVENTOR.
ALBERT HOHMANN
BY James H. Conner
AGENT.

Sept. 17, 1963     A. HOHMANN     3,103,983
FRICTION ERROR CORRECTING DEVICE
Filed Jan. 4, 1962     4 Sheets-Sheet 2
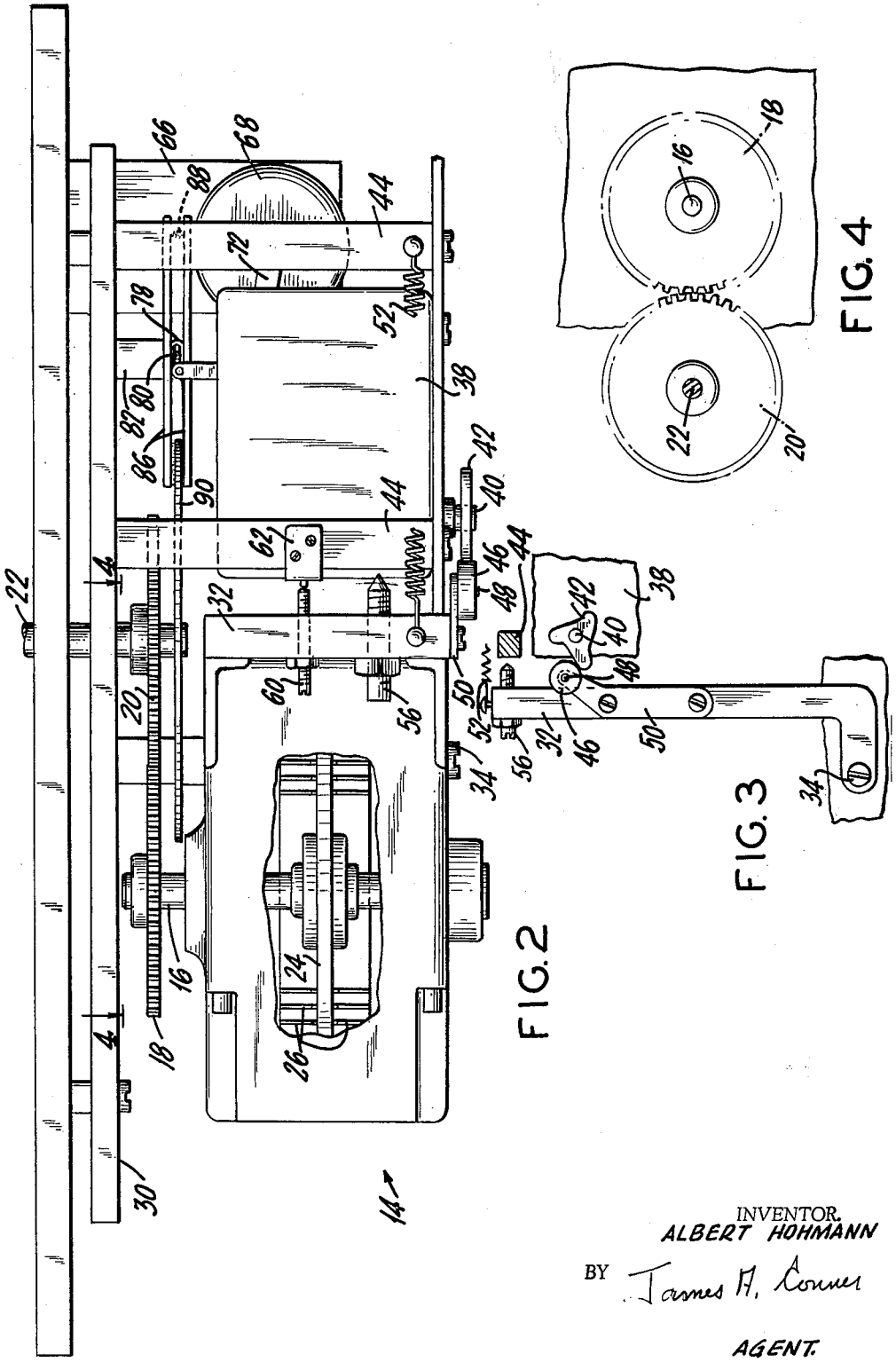
INVENTOR.
ALBERT HOHMANN
BY James H. Conner
AGENT.

INVENTOR.
ALBERT HOHMANN
BY
AGENT.

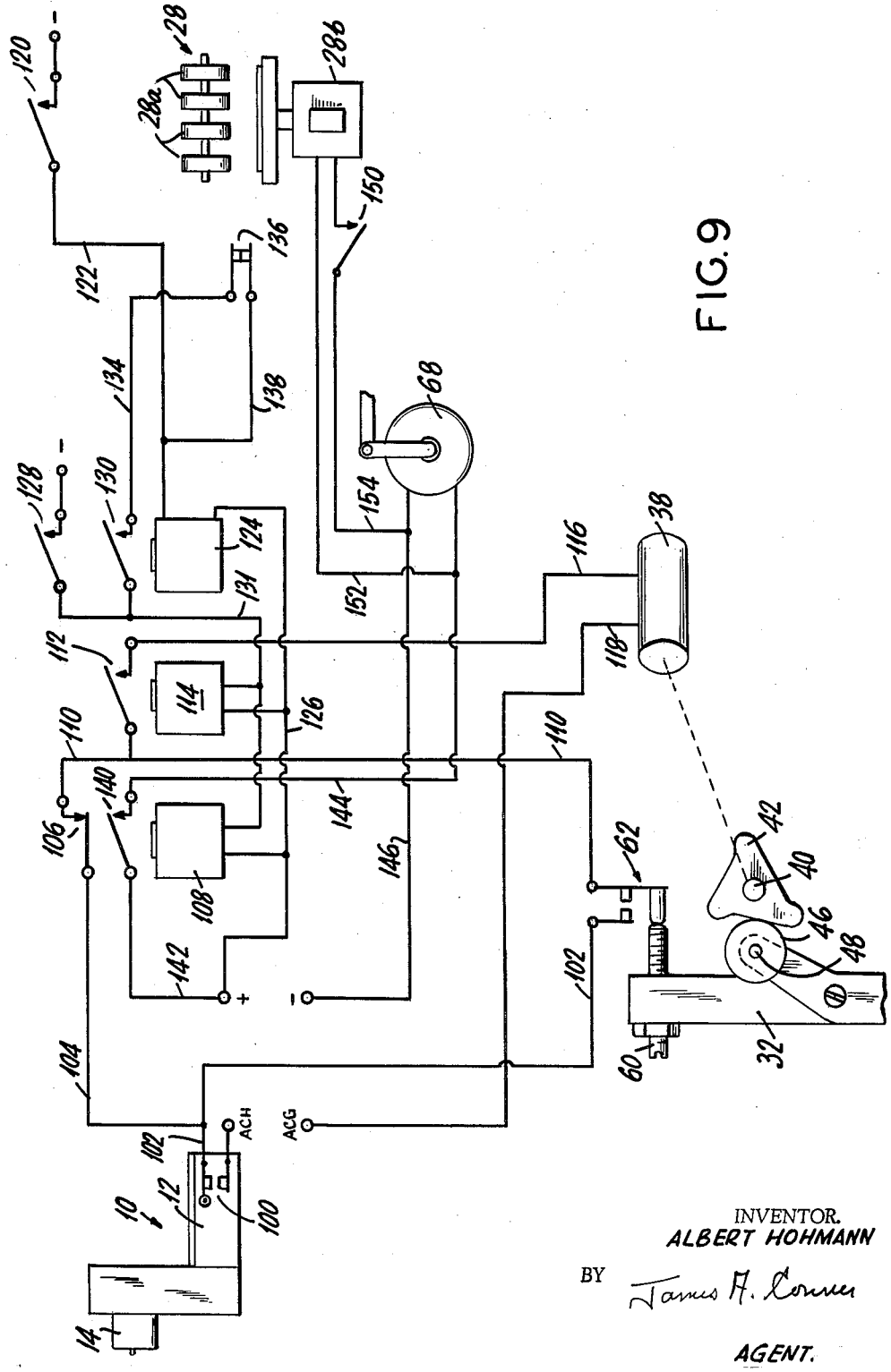

ns Patent Office 3,103,983
Patented Sept. 17, 1963

3,103,983
FRICTION ERROR CORRECTING DEVICE
Albert Hohmann, Brooklyn, N.Y., assignor to American
Electronics, Inc., Fullerton, Calif., a corporation of
California
Filed Jan. 4, 1962, Ser. No. 164,340
12 Claims. (Cl. 177—2)

This invention relates generally to error correcting devices and more particularly to a device for automatically correcting drag or friction error induced in a driving member by the driven member.

The present invention, although not limited to, is particularly applicable to weighing systems having remote electrical readout of the load being weighed. Electrical readout devices, when coupled to a scale, introduce additional friction on the scale balance and the scale accuracy is undesirably reduced by the amount of friction. Generally, readout devices require brush contacts wiping on a rotating printed circuit disc that electrically senses the angle of the printed circuit disc and controls extraneous equipment thereby.

Many prior devices have attempted to eliminate the friction caused by the wiping contacts by removing the contacts during movement of the scale balance. In many instances, removal of the brush contacts is not practical and the present invention provides a means for correcting the friction induced error without disengaging the brush contacts from the printed circuit disc.

Accordingly, one of the principal objects of the invention resides in the provision of means to automatically correct a readout device for the error introduced by the readout device.

Another object is to provide a correcting device that can utilize a standard conventional digitizer or readout device without undue alterations and changes to the conventional digitizer.

Still another object is to provide a correcting device that is easily maintained and will readily accept replacement digitizers with a minimum of effort and adjustment.

Yet another object is to provide a means for correcting the amount of error induced by a driven member on a driving member.

Other ancillary objects will be, in part, hereinafter apparent and will be, in part, hereinafter pointed out.

Figure 5:
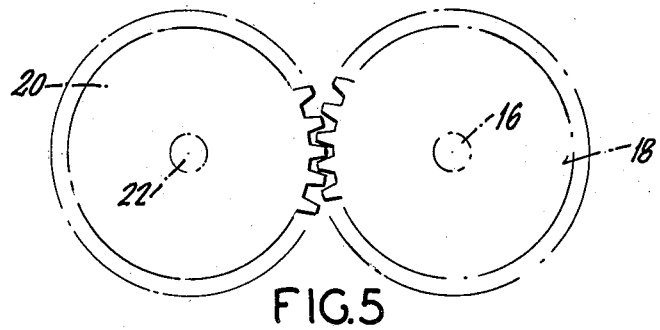
Figure 6:
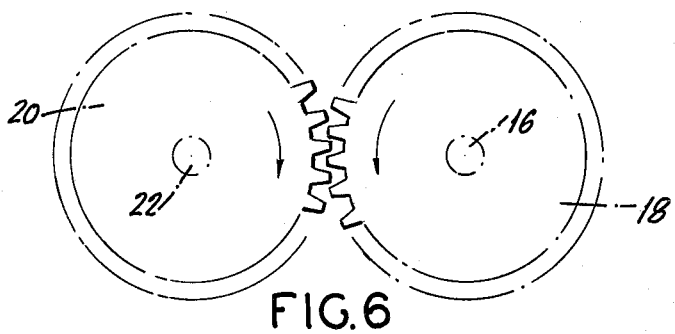
Figure 7:
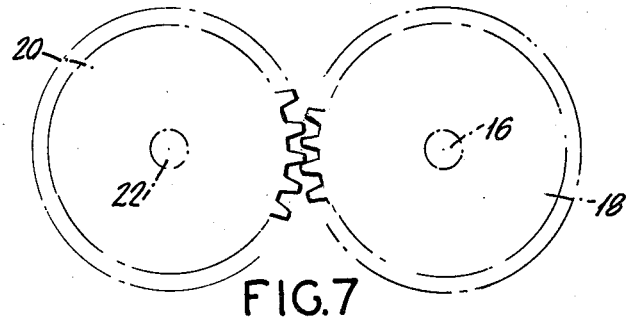
Figure 8:
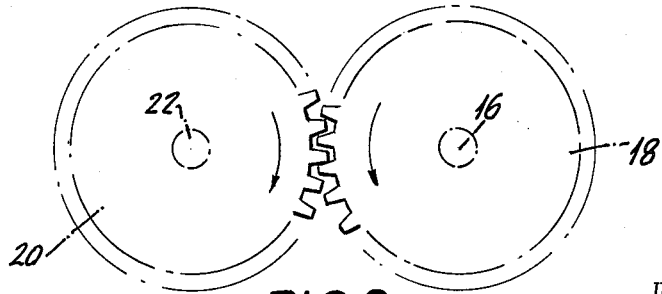

In the drawings:
FIGURE 1 is a front elevation of a digitizer incorporating the correcting means.
FIGURE 2 is a plan elevation.
FIGURE 3 is a front elevation detail of the pulsing mechanism.
FIGURE 4 is a cross-section detail taken along line 4—4 of FIGURE 2.
FIGURE 5 is an enlarged detail of the driving gear and the driven gear in normal meshing engagement.
FIGURE 6 is an enlarged detail of the driving gear disposed away from the driven gear.
FIGURE 7 is an enlarged detail of the driving gear as moved to its correct position.
FIGURE 8 is an enlarged detail of the driven gear moved to its correct position by the correctly positioned driving gear.
FIGURE 9 is a schematic circuit diagram of the controlling means for correcting friction error.

Referring to the drawings in detail, 10 generally designates a weighing scale having a platform 12 and a scale balance, not shown. Mounted on scale 10 and controlled thereby is a digitizer 14. Digitizer 14 is a conventional device having a rotatable input shaft 16 that is driven by a gear 18 meshing with a gear 20 affixed to a shaft 22 that is rotated in direct relationship with the scale balance.

Digitizer 14 consists of a rotatable printed disc 24 that rotates in incremental relationship with the scale capacity and is provided with a plurality of brush contacts 26 that continually engage the printed circuit disc 24. Obviously, brush contacts 26 produce a frictional drag on the disc 24 and introduce an error that, although held to a minimum, nevertheless is an error and is objectionable. The electrical circuitry controlled by brush contacts to control extraneous means, not shown, is not deemed pertinent to the present invention and is not described in detail herein. Such extraneous control means is well known to those skilled in the art. For the present invention, it may be stated that digitizer 14 controls printing means 28, FIGURE 9, as hereinafter described.

Digitizer 14 is mounted as a complete unit on a base plate 30 by means of a bracket 32 pivotally mounted on a stud 34, affixed to plate 30; i.e. limited pivotal movement of digitizer 14 and gear 18 thereon is provided by means and for a purpose hereinafter described.

Also affixed to base plate 30 is a motor 38 having a shaft 40 and a triangular shaped cam 42 mounted thereon. Motor 38 is mounted on plate 38 by means of plural studs 44. Cam 42 is disposed in planar relation with a follower roller 46 journalled on a stud 48 affixed to a bracket 50 adjustably mounted on pivotal bracket 32. Thus, rotation cam 42 by motor 38 repetitively pivots or pulses bracket 32 with digitizer 14 thereon. Spring 52 affixed at one end to a motor stud 44 and at the other end to the bracket 32, maintains follower roller 46 in engagement with the periphery of cam 42. A screw 56, threadedly mounted in bracket 32, is adapted to engage a motor mounting stud 44 and thereby limit the clockwise rotation of digitizer 14, as viewed in FIGURE 1. Screw 56 provides a fine adjustment for means hereinafter described. A screw 60, also mounted on bracket 32, is adapted to engage a micro-switch 62 mounted on motor stud 44 and actuate said switch when bracket 32 is in the clockwise limit as shown in FIGURE 1.

Mounted on an angle bracket 66 affixed to base plate 30 is a rotary solenoid 68 having an armature 70. Pivotally secured to armature 70 is a link 72 that is pivotally secured to stud 74. Stud 74 is pivotally secured to arm 76 that is in turn affixed to the brake spreader cam 78. Cam 78 is journalled on a stud 80 that is affixed to a bracket 82 mounted on plate 30. Disposed parallel to cam 78 and pivotally mounted on bracket 82, as by studs 84, is a pair of brake levers 86 that are urged apart at one end by compression spring 88 and are adapted at the other end to engage brake disc 90. Disc 90 is affixed to and rotatable with shaft 22, hereinbefore set forth as the output shaft of scale 10.

It will be noted from the foregoing description that motor 38 pivots digitizer 14 and accordingly gear 18 away from gear 20. The pivotal action is limited so that gear 18 does not entirely disengage from gear 20. This movement from a normal meshing relationship to a relatively loose meshing relation is utilized as the means for correcting drag or friction error induced by digitizer 14 as hereinafter described.

It is apparent that the application of a load on the scale platform causes shaft 22, gear 20, shaft 16 and gear 18 to rotate accordingly. During the initial movement of the scale balance, the friction or drag induced by the digitizer 14 is insignificant as the mass force of the moving scale element far exceeds the digitizer friction. However, as the scale approaches a balanced condition, the force diminishes to a degree equal to that of the friction in the digitizer. Thus, the scale cannot balance at the correction weight position. By loosening the gear drive between the scale and the digitizer, the exaggerated play or backlash permits the scale balance to approach a more perfect balance. As the gears re-enegage in a normal meshing relation, the mass of the scale balance output overcomes the friction retarded digitizer and rotates the digitizer input gear accordingly. This procedure may be repeated several times to incrementally advance the digitizer to its proper readout position. FIGURES 5, 6, 7, and 8 illustrate the four essential steps of advancing and correcting the driven member. In FIG. 5, gear 20 is disposed in normal meshing engagement with gear 18 such as the condition existing when the scale balance comes to rest. When cam 42 has rotated to a position wherein follower roller 46 rides on the high dwell of cam 42, gear 18 has moved away from gear 20 its maximum distance, as shown in FIGURE 6. The retarding friction of digitizer 14 has been effectively removed from the influence of the scale and gear 20 is free to rotate clockwise until gear 20 engages gear 18, as shown in FIGURE 7. Gear 20 is arrested by the still existing friction in gear 18. However, as follower roller 46 rides onto a low dwell of cam 42, spring 52 pulls gear 20 into normal meshing engagement with gear 18. This re-engaging motion, FIGURE 8, rotates gear 18 counter clockwise incrementally the equivalent of the increment of rotation that gear 20 rotated in FIGURE 7. Gear 20 does not rotate counter clockwise under the influence of gear 18 since the mass coupled to gear 20 is much greater than the mass coupled to gear 18.

Therefore, gear 20 influences gear 18 but gear 18 does not influence gear 20.

The clearance or play between the driving gear and the driven gear along with the number of teeth per gear is mathematically determined in proportion to the unit of weight accuracy of the scale and the induced unit of weight error in the digitizer. Assuming the frictional error to be approximately two pounds and the scale maximum to be approximately five hundred pounds and a single revolution of gear 20 equaling the scale maximum and the scale accurate to within several ounces, then the circumference of gear 20 is predetermined to equal a fixed arithmetic value. The clearance would then be determined as approximately one two hundred and fiftieth of the fixed value. Thus, a single reciprocation of the gear 18 would correct the digitizer to compensate for the friction error. Since a scale balance in seeking a balanced condition overbalances and underbalances several times while continually narrowing the over and under balance, the motor 38 rotates cam 42 as many increments as necessary to continuously correct for the digitizer friction. A control circuit is disclosed in FIGURE 9 of the drawings, and may be traced as follows: from a source of alternating current hot through a normally open platform switch 100 in scale 10. Platform switch 100 is adapted to close and remain closed upon the application of a load on scale 10. The circuit continues from switch 100 along conductors 102, 104 to a normally closed pair of contacts 106 associated with a slow-to-energize relay 108, through contacts 106 and over conductor 110 to one terminal of a normally open pair of contacts 112. Contacts 112 are associated with a relay 114. When contacts 112 are closed, as when relay 114 is energized, the circuit continues over conductor 116 to one terminal of motor 38. The other terminal of motor 38 is connected by conductor 118 to a source of alternating current ground.

Thus, when switch 100 and contact pairs 106 and 112 are closed, motor 38 is energized and cam 42 rotates to reciprocate digitizer 14 and permits gears 18 and 20 to perform the aforementioned correcting operation.

The correcting of error is delayed until a readout of the scale is desired. Therefore, a readout demand control is provided as follows: from a source of negative potential through a normally open switch 120. Switch 120 may be closed by manual or other means to initiate a print readout. For simplicity, switch 120 is illustrated as a simple manually operated momentary closing type. When closed, the circuit continues over conductor 122 to one terminal of the coil of relay 124. The other terminal of the coil of relay 124 is connected by conductor 126 to a source of positive potential. Thus, closure of switch 120 energizes relay 124 and closes normally open pairs of contacts 128 and 130. Contacts 128 control the energization of relays 108 and 114. This circuit may be traced from a source of negative potential through closed contacts 128 over conductor 131 to one terminal of each of the coils of relays 108 and 114. The other terminal of each of the coils of relays 108 and 114 is connected to conductor 126 and the positive source of potential. Thus, relay 114 energizes to close contacts 112 and motor 38 rotates cam 42. Relay 108 is a slow-to-make type and the opening of contacts 106 is delayed for a minimum predetermined period of time. During this period of time delay, digitizer 14 reciprocates and the error correcting operation, previously described, occurs. When relay 124 energized, a holding circuit was established as follows: from a source of negative potential, through closed contacts 128, over conductor 131, through closed contacts 130, over conductor 134, through normally closed switch 136 and over conductors 138 and 122 to the negative terminal of the coil of relay 124. Accordingly, relay 124 holds relays 108 and 114 energized.

As soon as relay 108 completes the time delay period and contacts 106 open, the circuit to motor 38 is broken. If cam 42 stopped on a high dwell, gears 18 and 20 would be held in their open or loose relationship. This condition is undesirable. Accordingly, means are provided to return cam 42 to the position wherein follower 46 rides on a low dwell and gears 18 and 20 are in normal meshing relation. Directed toward this end is an auxiliary motor control circuit which may be traced as follows: from a source of alternating current ground over conductor 118 to motor 38. Through motor 38, over conductor 116, through closed contacts 112, over conductor 110 to one terminal of micro-switch 62. The other terminal of micro-switch 62 is connected by conductor 102 and closed switch 100 to a source of alternating current hot. Micro-switch 62 is controlled by the position digitizer bracket 32 and if cam 42 stops with a high dwell holding bracket 32, digitizer 14 and gear 18 in the open position, then switch 62 will be closed and motor 38 continues to run. As soon as cam 42 rotates to permit bracket 32 to move to the position shown in FIGURE 9, screw 60 on bracket 32 engages switch 62 to open switch 62 and stop motor 38.

Concurrently, with the opening of contacts 106 by the delayed energization of relay 108, a pair of normally open contacts 140 close to couple a circuit that energizes the brake locking solenoid 68 to lock disc 90 in fixed relation. This locking effectively locks gears 18, 20 and disc 26 of digitizer 14 in a readout position. The circuit for energizing solenoid 68 may be traced from a source of positive potential over conductor 142 through closed contacts 140 over conductor 144 to one terminal of the coil of solenoid 68. From the other terminal of the coil of solenoid 68, the circuit continues over conductor 146 to a source of negative potential.

The print wheels 28a of printer 28 are set up in accordance with the readout of digitizer disc 24 by means, not shown, and analogously, the printing solenoid 28b is similarly controlled by means, not shown, but which actuate a normally open switch 150 to energize the print solenoid circuit. This circuit parallels the brake solenoid circuit and continues over conductors 152 to the coil of solenoid 28b. The other terminal of the coil of solenoid 28b is connected through conductor 154 and the extraneously controlled switch 150v, which when closed energizes solenoid 28b to take a print of print wheels 28a. Such printing is well known to those skilled in the art and need not be described in detail herein.

A print readout is the end result of the weighing system. Therefore, the platen actuated by the energized solenoid 28b momentarily opens switch 136 and opens the holding circuit to relay 124. The de-energization of relay 124 opens the circuits to relays 108 and 114 and all circuits restore to normal.

While there has been shown and described a weighing system incorporating the correcting device, it will be understood that other measuring systems could readily incorporate the present invention with minor modifications and changes falling within the scope of the following claims.

The invention claimed is:

1. In a device for correcting friction error induced by a driven member into the driving member, in combination, a gear, means to rotate said gear, a second gear normally meshing with said first gear, means rotated by said second gear including friction means that retard the rotation of said second gear, means to separate the first and second gear a predetermined distance while maintaining a loose meshing relationship, and means to restore said first and second gear to said normal meshing relation whereby said second gear is rotated by said first gear an amount equal to the friction error induced by said second gear in said first gear.

2. In a friction error correcting device for use in a measuring system having means for measuring an unknown value and electrical readout means actuated by said measuring means for controlling recording means to record the measured value, and said electrical readout means having a friction induced error, in combination normally meshing means coupling the measuring means with the electrical readout means, means to disengage the normally meshing means from the normal meshing relation to a loose meshing relation, and means to return said normally meshing means from said loose meshing relation to said normal meshing relation, and said disengaging means and returning means advancing said electrical readout means an amount equal to the amount said electrical readout means is retarded by the friction induced error.

3. In a friction error correcting device for use in a measuring system having means for measuring variable values and being provided with electrical readout means for controlling recording means to record the value of a measurement, in combination, gear means coupling the measuring means with the readout means, means actuatable to vary the meshing relationship of said gear means, and means to correct friction error in said electrical readout means upon the actuation of said meshing varying means.

4. In a friction error correcting device for use in a measuring system having means for measuring variable values and being provided with electrical readout means for controlling recording means to record the value of a measurement, in combination, gear means coupling the measuring means with the readout means, means actuatable to vary the meshing relationship of said gear means, means to correct friction error in said electrical readout means upon the actuation of said meshing varying means, and means to deactuate said meshing varying means when the friction error is corrected in said electrical readout means.

5. In a friction error correcting device for correcting the error introduced in a weighing system by the scale readout means, comprising, in combination, gear means coupling the scale balance to the readout means, means to vary the meshing relationship of the gear means from a normal meshing relation to a loose meshing relation, means to return the gear means to a normal meshing relation, and means integral with said gear means to correct the error in said readout means actuatable by the returning of said gear means to the normal meshing relation.

6. In a measuring system having a rotary output and a digital device rotated by the rotary output in digital incremental relation to the measurement being performed by said rotary output means to correct the error introduced into said rotary output by the friction produced by the digital device, comprising, a pair of gears, one of said gears being connected to said rotary output and the other of said gears being connected to said digital device, means normally positioning said pair of gears in normal meshing relation, and means actuatable to position said gears in a loose meshing relation to permit said rotary output to incrementally rotate to the correct error-free position, and said normally gear positioning means rotating said digital device to the corresponding correct error-free position.

7. In a weighing system including a weighing scale having a rotatable shaft rotatable in accordance with the load being weighed and a digital device rotated by said shaft and adapted to electrically read out the weight value of the load being weighed, said digital device having friction producing contacts that retard said digital device and introduce an error on said scale shaft, in combination therewith, means to disengage the digital device from said scale shaft to remove the brush retarding friction from said scale shaft, means to re-engage said digital device wih said scale shaft, and said re-engaging means automatically rotating said digital device an amount corresponding to the brush friction error.

8. In a weighing system including a weighing scale having a rotatable shaft rotatable in accordance with the load being weighed and a digital device rotated by said shaft and adapted to electrically readout the weight value of the load being weighed, said digital device having friction producing contacts that retard said digital device and introduce an error on said scale shaft, in combination therewith, means to disengage the digital device from said scale shaft to remove the brush retarding friction from said scale shaft, means to re-engage said digital device with said scale shaft, and said re-engaging means automatically rotating said digital device an amount corresponding to the brush friction error, and means to lock said digital device against rotation after said digital device has rotated the amount corresponding to the brush friction error.

9. In a weighing system including a weighing scale having a rotatable shaft rotatable in accordance with the load being weighed and a digital device rotated by said shaft and adapted to electrically readout the weight value of the load being weighed, said digital device having friction producing contacts that retard said digital device and introduce an error on said scale shaft, in combination therewith, means to disengage the digital device from said scale shaft to remove the brush retarding friction from said scale shaft, means to re-engage said digital device with said scale shaft, said re-engaging means automatically rotating said digital device an amount corresponding to the brush friction error, means to lock said digital device against rotation after said digital device has rotated the amount corresponding to the brush friction error, printing means adapted to print the digital weight value of the load being weighed, means to actuate said printing means to take a print, and means to delay the actuation of said printing means until after said digitizer device has rotated the amount corresponding to the brush friction error.

10. In a weighing system including a weighing scale having a rotatable shaft rotatable in accordance with the load being weighed and a digital device rotated by said shaft and adapted to electrically readout the weight value of the load being weighed, said digital device having friction producing contacts that retard said digital device and introduce an error on said scale shaft, in combination therewith, means to disengage the digital device from said scale shaft to remove the brush retarding friction from said sacle shaft, means to re-engage said digital device with said scale shaft, said re-engaging means being adapted to automatically rotate said digital device an amount corresponding to the brush friction error, means to lock said digital device against rotation after said digital device has rotated the amount corresponding to the brush friction error, printing means adapted to print the digital weight value of the load being weighed, means to actuate said printing means to take a print, means to delay the actuation of said printing means until after said digitizer device has rotated the amount corresponding to the brush friction error, and means controlled by the actuation of said printing means to release said locking means to permit said digital device to rotate in accordance with the succeeding weighing operation.

11. A device for correcting a retarding friction error in a gear driven electrical readout, comprising, in combination, a driving gear, a predetermined mass connected to and driving said gear, a driven gear, a mass less than said predetermined mass associated with said electrical readout and driven by said driven gear, means to move the driven gear away from the pitch line of the meshing driving gear, means to limit the moving means to move the driven gear to a loose mesh, means to return the driven gear to the pitch line of the driving gear and said returning means rotating the driven gear against the predetermined mass of the driving gear an amount equal to the friction error in said driven gear electrical readout.

12. In a gear drive having two meshing gears with similar diametrical pitch, means frictionally retarding one of said gears, means actuatable to loosely mesh said gears, means actuatable to normally mesh said gears, a predetermined mass driving one of said gears, a mass less than said predetermined mass driven by said other gear, and said loosely meshing means permitting the gear with the predetermined mass to advance and rotate said other gear a related amount when said normally meshing means is actuated.

References Cited in the file of this patent

UNITED STATES PATENTS

| | | |
|---|---|---|
| 1,023,495 | Bary | Apr. 16, 1912 |
| 1,988,072 | Depenbrock | Jan. 15, 1935 |
| 2,040,073 | Brendel | May 12, 1936 |
| 2,640,371 | Rosenleaf | June 2, 1953 |
| 2,978,561 | Dreyer | Apr. 4, 1961 |